(12) United States Patent
Nichols et al.

(10) Patent No.: US 8,357,787 B2
(45) Date of Patent: Jan. 22, 2013

(54) FORMULATIONS AND METHODS FOR SOLID CHITOSAN-CONTAINING BLENDS

(75) Inventors: Everett J. Nichols, Edmonds, WA (US); James R. Scott, Bellevue, WA (US)

(73) Assignee: HaloSource, Inc., Bothell, WA (US)

( * ) Notice: Subject to any disclaimer, the term of this patent is extended or adjusted under 35 U.S.C. 154(b) by 0 days.

(21) Appl. No.: 13/440,706

(22) Filed: Apr. 5, 2012

(65) Prior Publication Data

US 2012/0190757 A1 Jul. 26, 2012

Related U.S. Application Data

(63) Continuation of application No. 12/852,098, filed on Aug. 6, 2010, now Pat. No. 8,168,767, which is a continuation of application No. PCT/US2010/039259, filed on Jun. 18, 2010.

(51) Int. Cl.
*C08B 37/08* (2006.01)
(52) U.S. Cl. ................... 536/20; 536/18.5; 536/18.7
(58) Field of Classification Search ...................... None
See application file for complete search history.

(56) References Cited

U.S. PATENT DOCUMENTS

| | | | |
|---|---|---|---|
| 3,533,940 A | 10/1970 | Peniston | |
| 4,574,150 A | 3/1986 | Austin | |
| 4,964,894 A | 10/1990 | Freepons | |
| 5,736,532 A | 4/1998 | Furda | |
| 6,323,189 B1 | 11/2001 | Hardinge-Lyme | |
| 6,326,475 B1 | 12/2001 | Angerer | |
| 6,749,748 B1 | 6/2004 | Macpherson | |
| 6,821,427 B2 | 11/2004 | Macpherson | |
| 7,082,995 B2 | 8/2006 | Hanes, Jr. | |
| 2003/0018176 A1 | 1/2003 | Angerer | |
| 2003/0153467 A1 | 8/2003 | Cowan | |
| 2004/0127461 A1 | 7/2004 | Hung | |
| 2005/0239657 A1 | 10/2005 | Sakurai | |
| 2006/0115525 A1 | 6/2006 | Leane | |
| 2008/0190861 A1 | 8/2008 | Branning | |
| 2010/0105633 A1 | 4/2010 | Varum | |

FOREIGN PATENT DOCUMENTS

| | | |
|---|---|---|
| WO | 0024785 A1 | 5/2000 |
| WO | 2008087845 A1 | 7/2008 |
| WO | 2010023463 A2 | 3/2010 |

OTHER PUBLICATIONS

International Search Report and Written Opinion mailed Aug. 17, 2010, issued in corresponding International Application No. PCT/US10/39259, filed Jun. 18, 2010, 11 pages.

*Primary Examiner* — Patrick Lewis
(74) *Attorney, Agent, or Firm* — Christensen O'Connor Johnson Kindness PLLC

(57) ABSTRACT

Chitosan-containing blends and methods of dissolving and using chitosan are disclosed. A blend includes a solid acid or a solid agent that generates a proton in situ in the presence of water mixed together with a dry solid chitosan, and may optionally contain other components. The blends are in a dry, free-flowing, particulate form. Methods of dissolving a blend typically comprise adding a quantity of the blend to a low volume of water and mixing until the chitosan and solid acid or solid agent are dissolved and then further diluting this mixture by the addition of water, or used as-is. Devices containing the blends are also described along with methods of using the devices, such as for controlled release of solubilized chitosan in a body of water, such as a stream, containing impurities (e.g., particles, sediment, or suspended matter or dissolved substances) to cause flocculation or precipitation of such impurities.

29 Claims, 1 Drawing Sheet

FORMULATIONS AND METHODS FOR SOLID CHITOSAN-CONTAINING BLENDS

CROSS-REFERENCES TO RELATED APPLICATIONS

This application is a continuation of U.S. patent application Ser. No. 12/852,098, filed Aug. 6, 2010, which is a continuation of International Patent Application No. PCT/US2010/039259, filed Jun. 18, 2010, both of which applications are incorporated herein expressly by reference.

FIELD OF THE INVENTION

The present invention relates to a formulation of solid chitosan and a solid acid or a solid agent that generates a proton in situ in the presence of water blend having improved solubilization properties. The invention further relates to a process for solubilizing the solid chitosan contained in the blend. The invention further relates to a process for using the method of solubilization to achieve flocculation in an aqueous medium, such as a stream, containing matter, such as suspended sediment, insoluble organic matter, or soluble organic matter. The invention further relates to kits for use in flocculation in aqueous systems or streams containing such matter.

BACKGROUND

Chitin is a linear polysaccharide composed of β-(1-4)-linked 2-acetoamido-2-deoxy-D-glucose units that occur naturally in the exoskeleton of invertebrates, in particular, the carapace of marine crustaceans. Chemical deacetylation of chitin yields chitosan, which is a copolymer of 2-amino-2-deoxy-D-glucose and 2-acetoamido-2-deoxy-D-glucose units.

Soluble chitosan is useful as a coagulant and flocculant in removing impurities such as suspended sediment, proteins, fats, tannins, and metals from aqueous mediums. Soluble chitosan is more commonly used to remove contaminants such as suspended sediment and particulate matter from stormwater running off of construction sites.

Chitosan is insoluble in water, alkali solutions, and most organic solvents. Its effectiveness as a flocculant and coagulant requires it to be dissolved and delivered in soluble form to the aqueous medium containing the material to be coagulated or flocculated. The concentration of soluble chitosan delivered to the aqueous medium containing the material to be coagulated or flocculated affects its effectiveness as a flocculant or coagulant.

Chitosan is soluble in certain solutions of acids at defined acid and chitosan concentrations and slightly soluble to insoluble in other acid solutions. The type of the acid can influence the consistency of the chitosan rendering it paste-like, gelatinous, or more like a pseudo-plastic. In soluble form, chitosan is most commonly found, in commercial applications, to be dissolved in dilute acetic or lactic acid. Because of the high viscosity that chitosan exhibits in dissolved form, commercial chitosan solutions typical exhibit concentrations ranging from 1% (wt./wt.) to 3% (wt./wt.). In flocculation/coagulation applications, the dissolved chitosan in the 1%-3% solutions is metered into the aqueous medium containing the impurity, such as stormwater or industrial water using a metering pump. Higher concentrations (>3%) of dissolved chitosan exhibit such high viscosities that delivery using a metering pump becomes difficult and not practical. Therefore, this limits the commercial applications of liquid chitosan solutions due to the cost of shipping, which is based on weight. For example, a 3% chitosan solution is essentially ~97% water and the shipping cost is primarily attributed to water.

An alternative to liquid formulations has been to prepare dry solid chitosan salts that are water soluble. This involves reacting chitosan, dispersed in an organic medium, with an organic acid. The reaction product is then dried, resulting in a dry solid protonated chitosonium salt derivative that is water soluble. Although the production of a dry solid water soluble chitosonium salt mitigates the cost limitations of shipping a 1-3% chitosan solution, there is the production cost to produce the chitosonium salt that still limits the number of potential commercial applications.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An alternative to chitosan dissolved in acidic solutions or solid water soluble chitosonium salts is to prepare a blend of (a) solid chitosan and (b) a solid acid or a solid agent that generates a proton in situ in the presence of water (also referred to herein as a "solid agent") such that the blend, when added to a relatively low volume of water, results in the solubilization of the chitosan. This solution of solubilized chitosan may then be diluted with water to a desired chitosan concentration, such as a 3% chitosan solution.

Thus, some embodiments of the present invention contemplate a method of solubilizing chitosan comprising: (1) selecting a desired final chitosan concentration having a total volume of water, $V_F$; (2) obtaining a blend comprising: a solid chitosan that may be partially protonated but is greater than 80% insoluble when added to water and in a dry, free-flowing, particulate form, and a solid acid or a solid agent that generates a proton in situ in the presence of water, wherein the solid acid or the solid agent that generates a proton in situ in the presence of water is in a dry, free-flowing, particulate form, wherein the solid chitosan and the solid acid or the solid agent that generates a proton in situ in the presence of water are not reacted together or otherwise chemically bound, and wherein the solid chitosan in the blend is not soluble when added to the total volume of water, $V_F$; (3) adding one or more volumes of water, $V_1$, to the blend, wherein $V_1$ is less than $V_F$ and $V_1$ is effective to swell and dissolve the solid chitosan within a predetermined time period, and optionally adding subsequent volumes of water $V_1$ or fractions thereof, when after an addition of $V_1$, the solid chitosan does not swell and dissolve after the predetermined time period; and (4) after the solid chitosan has swelled and dissolved, adding water to bring the total volume of added water to $V_F$, thereby producing solubilized chitosan of a desired concentration.

Also contemplated is a method of solubilizing chitosan comprising: (1) selecting a desired final chitosan concentration having a total volume of water, $V_F$; (2) obtaining a blend consisting of: a solid chitosan that may be partially protonated but is greater than 80% insoluble when added to water and in a dry, free-flowing, particulate form, a solid acid defined as solid malic acid, solid citric acid, or solid tartaric acid, wherein each solid acid is in a dry, free-flowing, particulate form, wherein the solid chitosan and the solid acid are not reacted together or otherwise chemically bound, and wherein the solid chitosan in the blend is not soluble when added to the total volume of water, $V_F$; and optionally a component selected from the group consisting of solid sodium acetate, glycerin, a solid salt of the solid acid or a solid salt of a different solid acid, a solid preservative acid, a solid salt of a preservative acid, a solid antimicrobial agent, a solid metal salt, a solid neutral aqueous-soluble polysaccharide, a solid cationic aqueous-soluble polysaccharide, a solid anionic aqueous-soluble polysaccharide, a solid organic amine, or a solid inorganic amine, or a combination thereof, wherein each component aside from glycerin is in a dry, free-flowing, particulate form; (3) adding one or more volumes of water, $V_1$, to the blend, wherein $V_1$ is less than $V_F$ and $V_1$ is effective to swell and dissolve the solid chitosan within a predetermined time period, and optionally adding subsequent volumes of water $V_1$ or fractions thereof, when after an addition of $V_1$, the solid chitosan does not swell and dissolve after the predetermined time period; and (4) after the solid chitosan has swelled and dissolved, adding water to bring the total volume of added water to $V_F$, thereby producing solubilized chitosan of a desired concentration.

Compositions of blends are also provided. In some embodiments, a composition comprises a blend of: a solid chitosan that may be partially protonated but is greater than 80% insoluble when added to water and in a dry, free-flowing, particulate form, and solid sodium diacetate or solid potassium diacetate, or a combination thereof, that is in a dry, free-flowing, particulate form, wherein the solid chitosan and the solid sodium diacetate or solid potassium diacetate, or combination thereof, are not reacted together or otherwise chemically bound. Methods of solubilizing blends or compositions comprising blends are also provided. In some embodiments, a method of solubilizing a composition comprising a blend of a solid chitosan that may be partially protonated but is greater than 80% insoluble when added to water and in a dry, free-flowing, particulate form, and solid sodium diacetate or solid potassium diacetate, or a combination thereof, that is in a dry, free-flowing, particulate form, wherein the solid chitosan and the solid sodium diacetate or solid potassium diacetate, or combination thereof, are not reacted together or otherwise chemically bound, the method comprising: (1) selecting a desired final chitosan concentration having a total volume of water, $V_F$; (2) obtaining the blend; (3) adding one or more volumes of water, $V_1$, to the blend, wherein $V_1$ is less than $V_F$ and $V_1$ is effective to swell and dissolve the solid chitosan within a predetermined time period, and optionally adding subsequent volumes of water $V_1$ or fractions thereof, when after an addition of $V_1$, the solid chitosan does not swell and dissolve after the predetermined time period; and (4) after the solid chitosan has swelled and dissolved, adding water to bring the total volume of added water to $V_F$, thereby producing solubilized chitosan of a desired concentration.

Further, any blend described herein may be solubilized by adding a volume of water that results in a chitosan concentration of greater or equal to about 1.0%.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
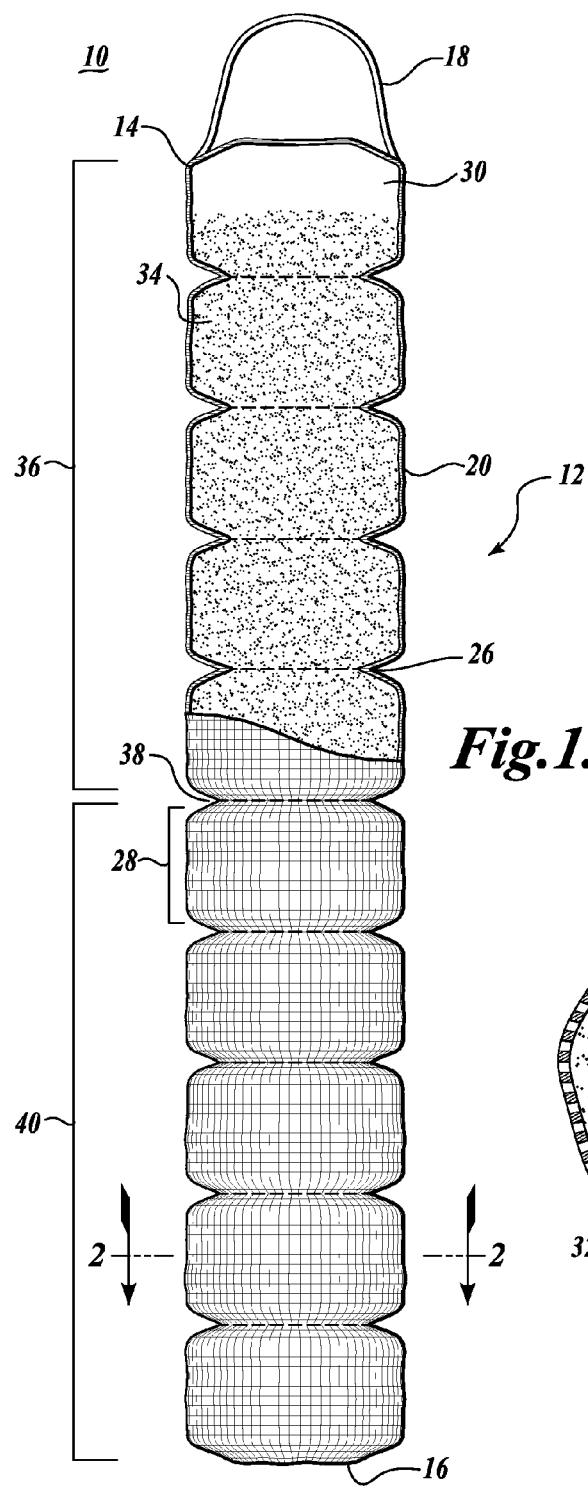
FIG. 1 shows a representative embodiment of a device of the present invention comprising a segmented body (partially cut away)

It has been discovered that the addition of a relatively low volume of water, optionally in increments, to a blend comprising a solid chitosan and a solid acid or solid agent that generates a proton in situ in the presence of water solubilizes the solid chitosan, whereas the solid chitosan is insoluble when the blend is mixed in a relatively large volume of water all at once. In some embodiments, the method comprises adding the blend to a relatively small volume of water, as compared to the total amount of water added to achieve a desired chitosan concentration, and stirring to dissolve the chitosan to produce a highly viscous paste or gel followed by slowly adding increasing amounts of water to achieve the desired chitosan concentration.

Use of solids herein that are in a dry, free-flowing, particulate form refer to solids that behave much like sand flowing from one portion of an hourglass to another. Use of the word "solid" is intended to exclude other states of matter such as liquids and gases.

Provided herein is a method of solubilizing chitosan comprising: (1) selecting a desired final chitosan concentration having a total volume of water, $V_F$; (2) obtaining a blend comprising: a solid chitosan that may be partially protonated but is greater than 80% insoluble when added to water and in a dry, free-flowing, particulate form, and a solid acid or a solid agent that generates a proton in situ in the presence of water, wherein the solid acid or the solid agent that generates a proton in situ in the presence of water is in a dry, free-flowing, particulate form, wherein the solid chitosan and the solid acid or the solid agent that generates a proton in situ in the presence of water are not reacted together or otherwise chemically bound, and wherein the solid chitosan in the blend is not soluble when added to the total volume of water, $V_F$; (3) adding one or more volumes of water, $V_1$, to the blend, wherein $V_1$ is less than $V_F$ and $V_1$ is effective to swell and dissolve the solid chitosan within a predetermined time period, and optionally adding subsequent volumes of water $V_1$ or fractions thereof, when after an addition of $V_1$, the solid chitosan does not swell and dissolve after the predetermined time period; and (4) after the solid chitosan has swelled and dissolved, adding water to bring the total volume of added water to $V_F$, thereby producing solubilized chitosan of a desired concentration.

The predetermined time may be about, at most about, or at least about 5, 10, 25, 20, 25, or 30 minutes, or any range derivable therein. The volume $V_1$ is greater than zero. The volume $V_1$ may be up to about 10% by volume of $V_F$. The volume $V_1$ may be up to about 5% by volume of $V_F$. The volume $V_1$ may be up to about 1% by volume of $V_F$. The volume may range from about, at least about, or at most about 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%, or any range derivable therein.

In some embodiments, the method of step (4) described above comprises adding a plurality of incremental volumes of water, such as 2, 3, 4, 5, 6, 7, 8, 9, or 10 increments, or any range derivable therein, wherein each incremental volume may be the same or different, with mixing after each addition, until $V_F$ is achieved, thereby providing solubilized chitosan of a desired concentration.

The solid chitosan may have an average molecular weight of between about 20,000 Da and about 2,000,000 Da. In some embodiments, the average molecular weight is about, at most about, or at least about 20,000, 50,000, 100,000, 150,000, 200,000, 250,000, 500,000, 750,000, 1,000,000, 1,250,000, 1,500,000, 1,750,000, or 2,000,000, or any range derivable therein. The solid chitosan may have a percent deacetylation of greater than about 50%. In some embodiments, the solid chitosan may have a percent deacetylation of about, at least about, or at most about 50%, 60%, 70%, or 80%, or more, or any range derivable therein.

In some embodiments, the particle size or the average particle size of the solid chitosan ranges from about 125 microns to about 850 microns. In some embodiments, about 90% of the particles of solid chitosan in a blend range from about 125 microns to about 850 microns, or have an average particle size that ranges from about 125 microns to about 850 microns. In some embodiments, the particle size or the average particle size of the solid chitosan is greater than 850 microns. In some embodiments, the particle size or average particle size of the solid chitosan ranges from about 850 microns up to about 1 cm. In some embodiments, the particle size or average particle size ranges from about 0.5 cm to about 1 cm.

In some embodiments, the particle size or the average particle size of the solid acid or solid agent ranges from about 125 microns to about 850 microns. In some embodiments, about 90% of the particles of solid acid or solid agent in a blend range from about 125 microns to about 850 microns, or have an average particle size that ranges from about 125 microns to about 850 microns. In some embodiments, the particle size or the average particle size of the solid acid or solid agent is greater than 850 microns. In some embodiments, the particle size or average particle size of the solid acid or agent ranges from about 850 microns up to about 1 cm. In some embodiments, the particle size or average particle size of the solid acid or solid agent is less than the solid chitosan particle size or average particle size. In some embodiments, the particle size or average particle size of the solid acid or solid agent is greater than the solid chitosan particle size or average particle size.

In some embodiments, the particle size of the solid chitosan is within about 20% of the particle size of the solid acid or the solid agent that generates a proton in situ in the presence of water. In some embodiments, the particle size of the solid chitosan is within about, at most about, or at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25%, or any range derivable therein, of the particle size of the solid acid or the solid agent.

In some embodiments, the solid acid is a protic acid. The solid acid may be malic acid, citric acid, tartaric acid, sodium diacetate, or potassium diacetate, for example. The solid acid may be sodium diacetate or potassium diacetate.

In some embodiments, the solid agent that generates a proton in situ in the presence of water is selected from the group consisting of a solid sulfite salt, a solid organic acid lactone, and a solid organic acid anhydride.

The ratio of a solid chitosan to a solid acid or solid agent that generates a proton in situ in the presence of water may vary. In some embodiments, the ratio of the solid chitosan to the solid acid or the solid agent that generates a proton in situ in the presence of water ranges from about 1:10 to about 10:1 (wt./wt.). In other embodiments, the ratio of solid chitosan to the solid acid or the solid agent that generates a proton in situ in the presence of water is about 1:1 (wt./wt.). In yet other embodiments, the ratio of solid chitosan to the solid acid or the solid agent that generates a proton in situ in the presence of water is about 1:2 (wt./wt.).

A blend may comprise additional components. In some embodiments, the blend further comprises glycerin. Addition of glycerin may aid in the solubility of chitosan. A blend may comprise a solid salt of the solid acid or a salt of a different solid acid, wherein the salt is in a dry, free-flowing, particulate form. A blend may comprise a solid preservative acid, a solid salt of a preservative acid, or a solid antimicrobial agent, wherein the solid preservative acid, the solid salt of a preservative acid, or the solid antimicrobial agent is in a dry, free-flowing, particulate form. In some embodiments, a blend may comprise a solid metal salt that is in a dry, free-flowing, particulate form. A blend may comprise a solid, neutral polysaccharide that is in a dry, free-flowing, particulate form. A blend may comprise a solid cationic or solid anionic polysaccharide, wherein the solid cationic or solid anionic polysaccharide is in a dry, free-flowing, particulate form. A blend may comprise a solid organic amine that is in a dry, free-flowing, particulate form. In some embodiments, a blend further comprises a solid inorganic amine that is in a dry, free-flowing, particulate form.

In some embodiments, a blend is further defined as a blend of a solid chitosan, a solid protic acid, and a solid organic acid anhydride, wherein the solid chitosan, the solid protic acid, and the solid organic acid anhydride are each in a dry, free-flowing, particulate form.

Any blend described herein may further comprise sodium acetate. The acetate ion may aid in chitosan solubility.

The chitosan-containing blends described herein may be used to prepare a desired final chitosan concentration, such as a desired final chitosan concentration that ranges from about 1% to about 5% (wt./wt.). In some embodiments, the desired final chitosan concentration ranges from about 1% to about 3% (wt./wt.).

In some embodiments, a solid acid or the solid agent that generates a proton in situ in the presence of water is selected by a method comprising: (A) preparing a test blend of a test solid chitosan and a test solid acid or a test solid agent that generates a proton in situ in the presence of water, wherein the ratio of test solid chitosan to test solid acid or test solid agent that generates a proton in situ in the presence of water is about 1:1:1 (gram:gram:liter); wherein the test solid chitosan and the test solid acid or the test solid agent that generates a proton in situ in the presence of water are each in a dry, free-flowing, particulate form, and wherein the test solid chitosan and the test solid acid or the test solid agent that generates a proton in situ in the presence of water are not reacted together or otherwise chemically bound; (B) adding a test volume of water ($V_T$) to the test blend and mixing; (C) determining if the test solid chitosan swells and if the test blend dissolves, and then doing one of two things: (a) if the test solid chitosan swells and the test blend dissolves, then establishing that the test solid acid or test solid agent that generates a proton in situ in the presence of water solubilizes the test solid chitosan in water under these conditions; or (b) if the test solid chitosan does not swell and the test blend does not dissolve, then employing the test blend in step (2) of the method described above.

Also contemplated is a method of solubilizing chitosan comprising: (1) selecting a desired final chitosan concentration having a total volume of water, $V_F$; (2) obtaining a blend consisting of: a solid chitosan that may be partially protonated but is greater than 80% insoluble when added to water and in a dry, free-flowing, particulate form, a solid acid defined as solid malic acid, solid citric acid, or solid tartaric acid, wherein each solid acid is in a dry, free-flowing, particulate form, wherein the solid chitosan and the solid acid are not reacted together or otherwise chemically bound, and wherein the solid chitosan in the blend is not soluble when added to the total volume of water, $V_F$; and optionally a component selected from the group consisting of solid sodium acetate, glycerin, a solid salt of the solid acid or a solid salt of a different solid acid, a solid preservative acid, a solid salt of a preservative acid, a solid antimicrobial agent, a solid metal salt, a solid neutral aqueous-soluble polysaccharide, a solid cationic aqueous-soluble polysaccharide, a solid anionic aqueous-soluble polysaccharide, a solid organic amine, or a solid inorganic amine, or a combination thereof, wherein each component aside from glycerin is in a dry, free-flowing, particulate form; (3) adding one or more volumes of water, $V_1$, to the blend, wherein $V_1$ is less than $V_F$ and $V_1$ is effective to swell and dissolve the solid chitosan within a predetermined time period, and optionally adding subsequent volumes of water $V_1$ or fractions thereof, when after an addition of $V_1$, the solid chitosan does not swell and dissolve after the predetermined time period; and (4) after the solid chitosan has swelled and dissolved, adding water to bring the total volume of added water to $V_F$, thereby producing solubilized chitosan of a desired concentration. In this or any other method, the predetermined time period may be about 15 to about 30 minutes. The predetermined time may be about, at most about, or at least about 5, 10, 25, 20, 25, or 30 minutes, or any range derivable therein. The volume $V_1$ is greater than zero. The volume $V_1$ may be up to about 10% by volume of $V_F$. The volume $V_1$ may be up to about 5% by volume of $V_F$. The volume $V_1$ may be up to about 1% by volume of $V_F$. The volume may range from about, at least about, or at most about 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%, or any range derivable therein. The method of step (4) may comprise adding a plurality of incremental volumes of water, such as 2, 3, 4, 5, 6, 7, 8, 9, or 10 increments, or any range derivable therein, wherein each incremental volume may be the same or different, with mixing after each addition, until $V_F$ is achieved, thereby providing solubilized chitosan of a desired concentration.

Compositions comprising blends are also provided. In some embodiments, a composition comprises a blend of: a solid chitosan that may be partially protonated but is greater than 80% insoluble when added to water and in a dry, free-flowing, particulate form, and solid sodium diacetate or solid potassium diacetate, or a combination thereof, that is in a dry, free-flowing, particulate form, wherein the solid chitosan and the solid sodium diacetate or solid potassium diacetate, or combination thereof, are not reacted together or otherwise chemically bound. The ratio of solid chitosan to solid sodium diacetate or sodium potassium diacetate may range from about 1:1 to about 1:5 (wt./wt.). In some embodiments, the ratio ranges from about 1:2 to about 1:3 (wt./wt.). In compositions comprising a blend of a solid chitosan and solid sodium diacetate or solid potassium diacetate, the particle size of each may be any particle size or average particle size described herein. In some embodiments, the particle size or the average particle size of the solid chitosan and solid sodium diacetate or solid potassium diacetate are each about 125 microns to about 850 microns. In some embodiments, about 90% of the solid chitosan or the solid sodium diacetate or solid potassium diacetate ranges from about 125 microns to about 850 microns.

Also disclosed is a method of solubilizing a blend of solid chitosan and solid sodium acetate or solid potassium acetate, or a combination thereof, as described above, comprising: (1) selecting a desired final chitosan concentration having a total volume of water, $V_F$; (2) obtaining such a blend; (3) adding one or more volumes of water, $V_1$, to the blend, wherein $V_1$ is less than $V_F$ and $V_1$ is effective to swell and dissolve the solid chitosan within a predetermined time period, and optionally adding subsequent volumes of water $V_1$ or fractions thereof, such as 2, 3, 4, 5, 6, 7, 8, 9, or 10 fractions, or any range derivable therein, when after an addition of $V_1$, the solid chitosan does not swell and dissolve after the predetermined time period; and (4) after the solid chitosan has swelled and dissolved, adding water to bring the total volume of added water to $V_F$, thereby producing solubilized chitosan of a desired concentration.

To blends described herein, a volume of water (i.e., a non-incremental volume of water) may be added to result in a chitosan concentration of greater than or equal to about 0.1%. For example, to a blend comprising a solid chitosan and solid sodium acetate or solid potassium acetate as described above, a volume of water may be added to result in a chitosan concentration of greater than or equal to about 0.1%. The chitosan concentration may be from about 1% to about 5%, for example. The chitosan concentration may, in some embodiments, range from about 1% to about 3%. The ratio of chitosan to sodium diacetate or potassium diacetate may be about 1:2 or greater.

Chitosan. As noted above, chitosan is a copolymer of 2-amino-2-deoxy-D-glucose and 2-acetoamido-2-deoxy-D-glucose units. Chitosan is commercially available from a variety of sources, and the average molecular weight range and percent deacetylation may vary. For example, solid chitosan may have an average molecular weight of between about 20,000 Da and 2,000,000 Da and may have a percent deacetylation of greater than about 50%. A solid chitosan may be partially protonated but is typically greater than about, at least about, or at most about 65%, 70%, 75%, 80%, 85%, 90%, 95%, or 99% insoluble, or any range derivable therein, when added to water and in a dry, free-flowing, particulate form. In other words, greater than a particular percentage of the solid chitosan does not dissolve. Solid chitosan employed in blends described herein is in dry, free-flowing, particulate form that excludes any solvent, such as water or an organic solvent. Solid chitosan in blends also excludes chitosan complexes. In some embodiments, chitosan may be further defined as excluding a metal, such as chelated metal.

Solid Acids. Solid acids employed in blends described herein are in dry, free-flowing, particulate form. Solid acids are typically protic acids that, on dissociation, provide at least one proton ($H^+$). Both mono and polyprotic (e.g., diprotic) acids may be used. The term "monoprotic" is intended to refer to an acid having one displaceable hydrogen atom per molecule. The term "polyprotic" should be construed accordingly.

Non-limiting examples of protic acids include lactic acid, adipic acid, pyruvic acid, phenyl pyruvic acid, p-hydroxyphenylpyruvic acid, p-hydroxypyruvic acid, 2-keto-glutaric acid, glyoxylic acid, α-ketoisocaproic acid, oxalacetic acid, levulinic acid, acetoacetic acid, malonaldehydric acid, glutaraldehydic acid, malonaldehydic acid, glutaraldehydic acid, p-(3-formylpropyl)benzoic acid, 3-oxovaleric acid, 2-keto-3-hydroxybutyric acid, 3-benzoylpropionic acid, 4-benzoylbenzoic acid, caprylic acid, citraconic acid, citamalic acid, citrazinic acid, hexanoic acid, n-capric acid, glutamic acid, citric acid, tartaric acid, malic acid, maleic acid, malonic acid, propionic acid, succinic acid, fumaric acid, glycolic acid, D-glucuronic acid, benzoic acid, sorbic acid, salicylic acid, galacturonic acid, ascorbic acid, glucaric acid, (meso)-galactaric acid, D-arabinaric acid, oxalic acid, benzoic acid, sulphanilic acid, gluconic acid, palmitic acid, stearic acid, ethylene diamine tetraacetic acid, glucoheptonic acid, nicotinic acid, oleic acid, phytic acid, polygalacturonic acid, sulfamic acid, uric acid, carminic acid, L-pyroglutamic acid, D-pyroglutamic acid, amino benzoic acid, 6-amino caproic acid, glutaric acid, dodecylbenzene sulfonic acid, octanoic acid, glyoxylic acid, isovaleric acid, boric acid, mercaptoacetic acid, aspartic acid, alanine, arginine, asparagine, cysteine, glutamine, glycine, histidine, isoleucine, leucine, lysine, methionine, phenylalanine, proline, serine, threonine, tryptophan, tyrosine, valine, sodium diacetate, and potassium diacetate. In some embodiments, the solid acid is malic acid, citric acid, tartaric acid, sodium diacetate (a combination of acetic acid and sodium acetate), or potassium diacetate (a combination of acetic acid and potassium acetate). It is understood that liquid acids can be made into solid forms, i.e., solid lactic acid is commercially available in a solid form.

The corresponding solid salts of solid acids listed above may also be incorporated into the blends in combination with their respective solid acids or different solid acids.

Solid Agents. Solid agents that generate a proton in situ in the presence of water may also be employed (e.g., the solid agent provides at least one proton when dissolved in water). With regard to solid agents that generate a proton in situ in the presence of water, sulfite salts, organic acid lactones, organic acid anhydrides are contemplated.

Sulfite salts may be used because they form sulfurous acid when dissolved in water.

Organic acid lactones can also be used to formulate blends of solid chitosan. The lactones undergo hydrolysis in water and produce the corresponding organic acid in situ.

The hydrolysis rate of organic acid lactones into the corresponding acid can vary between different organic acid lactones. The in situ generation of the acid in an aqueous medium can likely influence the solubility profile of chitosan and may be very different compared to the solubility profile of the chitosan contained in the solid corresponding solid acid-solid chitosan blend. This is one way to control the solubilization rate of the chitosan. Examples of organic acid lactones include glucuronic acid lactone, D-glucono-1,4-lactone, gluconic acid lactone, galacturonic acid lactone, mannuronic acid lactone, glyconic acid lactone, D-glucofuranurono-6,3-lactone, and D-galactopyranurono-6,3-lactone.

Solid organic acid anhydrides can also be used in the blends of solid chitosan. The solid organic acid anhydrides undergo hydrolysis in water and produce the corresponding organic acid in situ. The hydrolysis rate of solid organic acid anhydrides into the corresponding acids can vary between different organic acid lactones. The in situ generation of the acid in an aqueous medium can likely influence the solubility profile of chitosan and may be very different compared to the solubility profile of the chitosan contained in the solid corresponding acid-solid chitosan blend. This is one way to control the solubilization rate of the chitosan. Non-limiting examples include succinic anhydride, maleic anhydride, malic anhydride, and citraconic anhydride.

It has also been demonstrated that derivatization of chitosan by the reaction of the anhydride in an aqueous medium such as water is possible. The resulting chitosan derivative is no longer cationic, but exhibits anionic properties due to covalent attachment of carboxyl functional groups derived from the anhydride, such as from succinylation with succinic anhydride. It is envisioned that a solid acid-solid chitosan blend containing the corresponding or different organic acid anhydride can result in formation of chitosan derivatives in situ that contain both cationic and anionic properties attributed to covalently bound carboxyl functions and protonated primary amines. The nature and properties of the chitosan derivative can be influenced and controlled by the ratio of solid acid to chitosan and the ratio of solid organic acid anhydride. It also envisioned that by controlling the ratio of organic acid anhydride added to solid chitosan in an organic acid anhydride blend without the addition of an added solid organic acid, the normal cationic chitosan could be converted into an anionic chitosan in situ. The solid organic acid anhydride-solid chitosan blend or solid organic acid-solid organic acid anhydride-solid chitosan blend could also be contained within a porous containment device capable of releasing the derivatized chitosan, as described below. The released derivatized chitosan would have desirable properties useful for flocculation, coagulation, precipitation (dissolved substances), coatings, etc.

In some embodiments, the solid acid is not hyaluronic acid, nicotinic acid (see U.S. Pat. No. 5,736,532), a fatty acid, a nucleic acid, lactic acid (see U.S. Publ. Appl. No. 2005/0239657), or succinic acid (see U.S. Publ. Appl. No. 2005/0239657). In some embodiments, the solid acid is not a non-phytotoxic acid, such as arginine, histidine, isoleucine, leucine, lysine, methionine, phenylalanine, threonine, tryptophan, valine, alanine, aspartic acid, citrulline, cystine, glutamic acid, glycine, hydroxyglutamic acid, norleucine, proline, serine, and tyrosine, adipic acid, hydrochloric acid, tartaric acid, nitric acid, formic acid, or citric acid (see U.S. Pat. No. 4,964,894).

In some embodiments, the solid acid or solid agent that generates a proton in situ in the presence of water is not a polymer (see WO 2010/023463). In some embodiments, the solid acid is not glyoxylic acid (see WO 2008/087845). In some embodiments, the solid acid is not ascorbic acid (see WO 00/024785).

Blends. The present invention further contemplates blends. Blends refer to any combination of a solid chitosan and one or more of the solid acids or agents discussed herein, and may optionally comprise additional components, as explained herein. Blends of a solid chitosan and a solid acid or a solid agent that generates an acid in situ in the presence of water refer to mixtures or formulations of dry, free-flowing, particulates of each component. The solid chitosan and the solid acid or the solid agent are not reacted together or otherwise chemically bound while in the blended condition. That is, the solid chitosan and the solid acid or the solid agent are chemically separate from each other. For example, the solid chitosan and the solid acid or the solid agent are not covalently bound together, do not form a complex, and are not cross-linked together, nor does one component "cage" the other component.

Blends may comprise, consist essentially of, or consist of a solid chitosan and a solid acid or a solid agent that generates an acid in situ in the presence of water. In some embodiments, the only two components of the blend are a solid chitosan and a solid acid or a solid agent. In blends consisting essentially of a solid chitosan and a solid acid or a solid agent, the blend excludes components that do not materially affect the novel and basic characteristics of the solid chitosan and the solid acid or the solid agent. For example, a blend consisting essentially of a solid chitosan and a solid acid or a solid agent may exclude water and organic solvents. It is specifically contemplated that a blend may comprise, consist essentially of, or consist of a solid chitosan, a solid acid, and a solid agent. Trace amount of impurities may be present in blends. Impurities may include, for example, digested proteinaceous material from the processing of chitin into chitosan, or mineral salts such as potassium or calcium carbonate or potassium or calcium phosphate.

Blends comprising a solid chitosan and a solid acid or a solid agent may, in some embodiments, be further defined as not comprised in a film, coating, or tablet. In some embodiments, the blend is not in layer form. In some embodiments, the blend is not comprised in a hydrogel. In some embodiments, a blend does not comprise, nor is comprised in, a slurry, a liquid, or a solution. In some embodiments, carbonates or bicarbonates are excluded from a blend (see U.S. Publ. Appl. No. 2008/0190861). In some embodiments, drugs are excluded from a blend (see U.S. Publ. Appl. No. 2006/0115525).

Different ratios of solid chitosan to solid acid or solid agent are possible on a weight or molar equivalent basis. This ratio would depend on the type of solid acid or solid agent used and the molecular weight and the degree of deacetylation of the solid chitosan. In some embodiments, the ratio of solid chitosan to solid acid or solid agent ranges from about 1:10 to about 10:1. In some embodiments, the ratio is about, at least about, or at most about 1:10, 1:5, 3:10, 2:5, 1:2, 3:5, 7:10, 4:5, 9:10, 1:1, 10:9, 5:4, 10:7, 5:3, 2:1, 5:2, 10:3, 5:1, or 10:1, or any range derivable therein.

The particle size range of the solid chitosan and the particle size range of the solid acid or solid agent in a blend may vary. It is expected that there would be an optimum particle size range for both the solid chitosan and the solid acid or solid agent. Existing data presented in the examples demonstrate that particles of solid chitosan that are less than 850 microns, such as ranging from about 125 to about 850 microns, can be effectively blended with solid acids exhibiting particle sizes that range in size from table salt and granulated refined sugar to powders. Larger particle sizes of solid acids and solid agents may also be used. In some embodiments, about 90% of the solid chitosan in a blend has a particle size of about 125 microns to about 850 microns. It is expected that particle sizes of chitosan greater than about 850 microns would also be effectively blended with solid acids or solid agents of a similar size range, or larger or smaller size range. In some embodiments, the particle size of the solid chitosan is within about, at most about, or at least about 10%, 20%, 30%, 40%, 50%, 60%, 70%, 70%, 80%, or 90% of the particle size of the solid acid or the solid agent, or any range derivable therein. When particle sizes are comparable in size, the chance of settlement of larger particles is minimized. It is typically easier to alter the particle size of the solid chitosan, which is typically in particle or flake form, to approach the size of the solid acid or solid agent, rather than vice versa. For example, coarse-ground chitosan, which is typically between about 0.25 cm to about 0.5 cm, may be further ground to approach the particle size of a solid acid or solid agent, which may be more of a powder.

Additional Components. In some embodiments, a blend containing solid chitosan and a solid acid or solid agent may comprise one or more additional components. Combinations of the following components are also contemplated. Typically, an additional component will be in a solid, dry, free-flowing, particulate form. However, embodiments contemplate blends containing glycerin to enhance the solubility of the solid chitosan.

Other embodiments include solid chitosan blended with combinations of solid acids together with solid salts of organic acids, wherein each salt is in a dry, free-flowing, particulate form. Examples include solid chitosan blended with lactic acid and calcium lactate; chitosan blended with lactic acid, calcium lactate in combination with sodium acetate; chitosan blended with adipic acid in combination with sodium or potassium acetate; chitosan blended with adipic acid in combination with sodium or potassium hexanoate; chitosan blended with glutamic acid in combination with sodium or potassium acetate; chitosan blended with glutamic acid in combination with sodium or potassium hexanoate; chitosan blended with solid adipic acid in combination with solid benzoic acid. These examples are not meant to be exhaustive but merely to provide examples of the types and possible varieties of combinations that are possible. These blends may act to influence chitosan's solubility properties and provide benefits in certain applications.

Another embodiment contemplates blends containing solid preservative acids or solid salts of preservative acids or solid antimicrobial agents that retard or prevent the growth of microorganisms such as molds, yeasts, fungi, and bacteria in the wetted blend. Such components are in a dry, free-flowing, particulate form. Non-limiting examples of solid preservative acids include benzoic acid, propionic acid, sorbic acid, or solid salts of these acids blended with solid acids such as glutamic acid, citric acid, adipic acid, tartaric acid, etc. Non-limiting examples of solid antimicrobial agents include parabens and methylparabens, sulfite salts, sodium and potassium sulfite, sodium or potassium metabisulfite, zinc salts, pyrithiones, essential oils, etc.

Another embodiment contemplates blends containing a solid metal salt that is in a dry, free-flowing, particulate form. Non-limiting examples of solid metal salts include lanthanum chloride, lanthanum oxide, lanthanum acetate, zirconium acetate, zirconium oxychloride, aluminum sulfate, aluminum chloride, ferric chloride, ferric sulfate, sodium aluminate, copper as $(FeSO_4.7H_2O)$, and iron salts.

Another embodiment contemplates blends containing solid, neutral (non-ionic) polysaccharides in a dry, free-flowing, particulate form that are typically water-soluble.

Non-limiting examples include guar, starch, glucomannans, glucans, methylcellulose, hydroxypropylcellulose, hydroxypropylmethylcellulose, galactomannans, mannans, xyloglucans. These blends can also contain solid metal salts to aid in coagulation or flocculation and removal of impurities in water.

Another embodiment contemplates blends containing solid anionic polysaccharides in a dry, free-flowing, particulate form that are typically water-soluble. Non-limiting examples include agars, carrageenans, xanthans, polygalacturonates, pectins, alginates, gellans, and carboxymethylcellulose.

Blends may also comprise solid cationic polysaccharides in a dry, free-flowing, particulate form that are typically water-soluble. Non-limiting examples include cationic guars or cationic starches.

Blends may comprise solid organic or inorganic amines in a dry, free-flowing, particulate form. Non-limiting examples include diallyl-dimethyl ammonium chloride, dimethylamine, dimethylaminoethyl-methacrylate, ethanolamine, methylamine, and triethylamine.

It is envisioned that solid metal salts or solid organic amines can be used in various combinations with solid cationic polysaccharides alone, solid neutral polysaccharides alone, or solid anionic polysaccharides alone. For example, a solid cationic polysaccharide may be combined in a blend with a solid metal salt or a solid organic amine, wherein each component is in a dry, free-flowing, particulate form. Alternatively, a solid, anionic polysaccharide may be combined in a blend with solid chitosan, a solid acid, and a solid metal salt, wherein each component is in a dry, free-flowing, particulate form. As another alternative, a solid neutral polysaccharide may be combined in a blend with a solid metal salt or a solid organic amine, a solid chitosan, and a solid metal acid, wherein each component is in a dry, free-flowing, particulate form.

Devices. Devices may be employed that contain blends described herein such that solubilized chitosan is released into water surrounding part or all of the device. For example, a permeable soluble chitosan delivery device may contain any blend of a solid chitosan and a solid acid or a solid agent that generates a proton in situ in the presence of water as described herein. Such devices are porous, wherein the pores allow water to enter and hydrate the blend, dissolving the solid chitosan and releasing soluble chitosan through the pores into the aqueous medium outside of the device. The pore size and quantity or configuration of the device can be made in a way to influence the release of the soluble chitosan. A delivery device may be a porous fabric (e.g., a porous "sock") or metal or plastic container. The delivery device may be a woven or non-woven porous material.

Another embodiment contemplates blends contained within a device for controlling the rate of release or dose of chitosan. The rate of solubilization and release of soluble chitosan can be controlled by, for example, the solubility of the acid chosen.

For example, a solid chitosan/solid malic acid blend versus a solid chitosan/solid lactic acid-solid calcium lactate blend contained in a textile sachet were compared with respect to their release rates of solubilized chitosan into water at pH 8. The solid chitosan/solid lactic acid-solid calcium lactate blend dissolved faster and exhibited a faster release rate from the sachet into the water compared to the solid chitosan/solid malic acid blend in conditions as set forth in Example 5. It is envisioned that a fast dissolving blend containing a solid chitosan and a solid acid or solid agent would be advantageous for certain waters containing impurities that need to be removed more rapidly. This could be due to a higher amount of impurities in the water requiring a higher dose rate of dissolved chitosan. The containment of solid organic acid lactones together with solid chitosan in porous permeable devices represents another embodiment. The hydrolysis rate of the lactone into the corresponding acid can influence the solubility rate and release of the dissolved chitosan and can be influenced by the size and quantity of pores of the containment device. It is also understood that solid organic acid lactones and solid chitosan can be blended together with solid organic acids in various ratios to influence the rate of solubilization of the chitosan.

In some embodiments, a permeable soluble chitosan delivery device is contemplated comprising a blend of a solid chitosan that may be partially protonated but is greater than 80% insoluble when added to water and in a dry, free-flowing, particulate form, a solid acid or a solid agent that generates a proton in situ in the presence of water, wherein the solid acid or the solid agent that generates a proton in situ in the presence of water is in a dry, free-flowing, particulate form, wherein the solid chitosan and the solid acid or the solid agent that generates a proton in situ in the presence of water are not reacted together or otherwise chemically bound as described herein, and a porous container that holds the blend. The porous container may be, for example, a segmented fabric sock. The sock may be exposed to running water, wherein a blend comprised in the sock dissolves. Non-limiting examples of devices are set forth in U.S. Pat. Nos. 6,749,748 and 6,821,427, each of which is incorporated herein by reference.

In one aspect, the present invention provides a device for reducing the amount of contaminants in water, each device comprising a blend as described herein disposed within a body defining a multiplicity of pores, wherein the pores may have an average diameter in the range of from 1 μm to 2000 μm. U.S. Pat. No. 6,749,748, incorporated herein by reference, discloses a suitable device.

Figure 2:
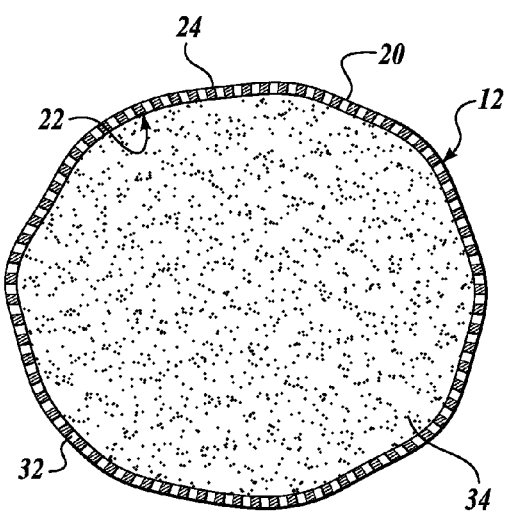
FIG. 2 shows a cross-sectional view of the device shown in FIG. 1 which more clearly shows the blend disposed within the device.

For example, FIG. 1 shows one embodiment of a device 10 of the present invention, which includes a body 12 that has a first end 14 and a second end 16, and a handle 18 attached to body first end 14. As shown more clearly in the cross-section of device 10 shown in FIG. 2, body 12 includes a body wall 20 defining an inner surface 22 and an outer surface 24. Again with reference to FIG. 1, body wall 20 includes stitching 26, perpendicular to the long axis of body 12, at regularly spaced intervals along its length that divide body wall 20 into segments 28. Each segment 28 defines a lumen 30. Body wall 20 is penetrated by a multiplicity of pores 32 (shown more clearly in FIG. 2) that connect body inner surface 22 and body outer surface 24.

A blend 34 is disposed within lumen 30 of each segment 28. In the embodiment shown in FIG. 1, lumen 30 closest to first end 14 is only partially filled with blend 34 in order to more clearly show lumen 30. Each segment 28 can include the same or different blend 34 as one or more of the other segments 28. The embodiment of device 10 shown in FIG. 1 is flexible. Flexibility is facilitated by the segmentation of body 12. Device body 12 includes a first half 36, extending from body first end 14 to body midpoint 38, and a second half 40, extending from body midpoint 38 to body second end 16.

In operation, device 10 is at least partially immersed in moving water that contains one or more contaminants. The water penetrates pores 32 and contacts blend 34 which begins to dissolve. Dissolved blend 34 leaves lumen 30 through pores 32 and forms insoluble complexes with contaminants in the water (although the formation of insoluble complexes can begin at the moment that blend 34 is dissolved by the water).

Although the embodiment of device 10 shown in FIG. 1 has a generally cylindrical (although segmented) shape when filled with blend 34, device 10 can be any shape that is adapted for use in a particular application. Device body 12 can be made from any material that is sufficiently strong to retain blend 34 and to resist the forces exerted by water moving over device 10, and which is sufficiently porous to allow water to penetrate device 10 to contact blend 34 within lumen 30, although pores 32 should not be so large that they permit rapid escape and dissolution of blend 34. Some embodiments of device body 12 are stretchable. Device 10 can optionally include an attachment means, such as handle 18, that is attached to device body 12 and that is used to attach device 10 to a support, such as to a metal or plastic pipe, when device 10 is disposed therein.

Methods. Disclosed herein are methods for solubilizing solid chitosan. As discussed in the background above, dilute solutions of chitosan are costly to ship. Accordingly, blends of solid dry chitosan and solid dry acids or solid dry agents provide an alternative to supplying chitosan in solution form, provided the chitosan blend can dissolve. It has been found that blending solid dry, solid chitosan that may be partially protonated but is greater than 80% insoluble when added to water and in a dry, free-flowing, particulate form with a solid dry acid or a solid dry agent will not result in a blend that dissolves when added to a high volume of water such as the total amount of water used to prepare a 1-5% chitosan solution (wt./wt.), but will dissolve when low volumes of water are added. After addition of a low volume of water that causes the solid chitosan in the blend to swell and dissolve within a predetermined period of time, the remainder of the water can be added to bring the final chitosan concentration to that which is desired, such as 1-5% (wt./wt.) or 1-3% (wt./wt.). The predetermined time may be about, at least about, or at most about 5, 10, 15, 20, 25, or 30 minutes, or any range derivable therein.

Other blends will dissolve in high volumes of water. Therefore, methods for solubilizing blends that are capable of dissolving when added to high volumes of water such that the chitosan concentration is at least 0.1% are also contemplated.

Also contemplated is a method of releasing soluble chitosan into water comprising contacting the permeable soluble chitosan delivery device with water to release soluble chitosan into the water. In some embodiments, flocculation or precipitation of matter in the water is induced after soluble chitosan is released into the water. As used herein, "flocculation" refers to a process of contact and adhesion whereby particles of a dispersion form larger-size clusters. Flocculation is synonymous with coagulation. As used herein, "precipitation" refers to the sedimentation of a solid material from a liquid solution. The matter may be organic matter. The matter may be selected from the group consisting of particles, sediment, suspended matter, and dissolved substances. The water may be moving water, stream water, or stormwater.

Methods of determining solubility of chitosan are well-known in the art. One may determine solubility by, for example, weighing a sample of solid chitosan and correcting for moisture, form a solution with dilute acid, filter the solution through tared filter paper and collect insoluble material on the tared filter paper, dry and weigh the paper, and then calculate the percent of material that did not dissolve.

Methods may comprise steps described herein, or may consist of only of such steps, to the exclusion of any other steps. Methods may alternatively consist essentially of steps described herein. Methods consisting essentially of steps are methods that exclude components or steps that do not materially affect the novel and basic characteristics of the method or its effects. For example, methods consisting essentially of solubilizing chitosan in a chitosan-containing blend described herein to achieve a desired final chitosan concentration may exclude addition of a volume of a dilute acid solution.

It is contemplated that any embodiment discussed herein can be implemented with respect to any method, composition, or blend of the invention, and vice versa. Furthermore, blends and compositions described herein can be used to achieve methods of the invention.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value. In any embodiment discussed in the context of a numerical value used in conjunction with the term "about," it is specifically contemplated that the term "about" can be omitted.

Following long-standing patent law, the words "a" and "an," when used in conjunction with the word "comprising" in the claims or specification, denotes one or more, unless specifically noted.

Publications cited herein and the material for which they are cited are hereby specifically incorporated by reference in their entireties.

The following examples are provided for the purpose of illustrating, not limiting, the material disclosed herein.

EXAMPLES

In each Example below, solid chitosan was ground and passed through a 20 mesh screen. The solid particles that passed through the screen were then employed. About 90% of the particles that passed through the screen ranged from about 125 microns to about 850 microns. The water employed in each Example was deionized water.

Example 1

High Volume Water Dissolution of Blends

Test 1. Mix 1 gm of solid acid and 1 gm of solid chitosan. Then slowly pour this blend into 1 L of stirring deionized water. Determine if chitosan is soluble. See Table 1 below.

TABLE 1

| Sample | Acid | Solubility | Time | Results (Visual) | Comments |
|---|---|---|---|---|---|
| 1 | Adipic | Good | Fast | Only a few particles left | |
| 2 | Glutamic | Fair-Good | Medium | ~100 particles left | Added 1 gm more acid to solution, better solubility resulted. |
| 3 | Glycine | Poor | Slow | ~1000s particles left | |
| 4 | Tartaric | Poor | Slow | ~1000s particles left | Starting with 2 gm acid did not improve solubility. |
| 5 | Malic | Poor | Slow | ~1000s particles left | Added 1 gm more acid to solution, no solubility change. |
| 6 | Maleic | Good | Fast-Med | Only a few particles left | |
| 7 | Malonic | Poor-Fair | Slow | ~1000s particles left | Added 1 gm more acid to solution, better solubility resulted. |
| 8 | Succinic | Poor | Slow | ~1000s particles left | Added 1 gm more acid to solution, no solubility change. |
| 9 | Fumaric | Poor | Slow | ~1000s particles left | |
| 13 | Glycolic | Good | Fast | Only a few particles left | |
| 11 | Glucuronic | Fair | Medium | ~100 particles left | |
| 12 | Citric | Poor | Slow | ~1000s particles left | Added 1 gm more acid to solution, no solubility change. Starting with 2 gm acid did not improve solubility. |
| 13 | Benzoic | Good | Fast | Only a few particles left | |
| 14 | Sorbic | Poor-Fair | Slow-Med | ~500 particles left | Added 1 gm more acid to solution, no solubility change. |
| 15 | Salicylic | Poor | Slow-Med | ~1000s particles left | Added 1 gm more acid to solution, no solubility change. |
| 16 | Galacturonic | Fair | Medium | ~100s particles left | Added 1 gm more acid to solution, slightly better solubility. |

TABLE 1-continued

| Sample | Acid | Solubility | Time | Results (Visual) | Comments |
|---|---|---|---|---|---|
| 17 | Lactic (dry) | Fair | Medium | ~100s particles left | |
| 18 | Gluconic acid lactone | Fair | Medium | ~100s particles left | |
| 19 | Ascorbic | Fair | Medium | ~100s particles left | Added 1 gm more acid to solution, no solubility change. |

Some solid acids solubilized chitosan well using the above method; others needed more acid to dissolve the chitosan; and still other acids did not solubilize the chitosan under the above scenario even with additional acid added.

Example 2

Low Volume Water Dissolution of Blends

Low Volume Solubility (LVS) Test

Test 2. The acids used for this experiment were chosen from the acids that did not solubilize chitosan from Test 1. See Table 1 above.

Mix 1 gm of solid acid and 1 gm of solid chitosan. Then slowly add water (2.5-5.0 ml) to this admixture and mix. Allow time (up to 5 minutes) for the chitosan to swell, then slowly add more water, about 2.5-5.0 ml at a time. Allow time for the chitosan to swell and dissolve. Determine if chitosan is soluble. If chitosan is not swelling and dissolving after 10 ml of water, the acid will not work under these conditions. One may then try 2 gm acid per 1 gm chitosan or add sodium acetate, as the acetate counter ion may improve solubility. If after about 30 minutes or 20 ml of water the chitosan is swelling and dissolving, then add 10 ml of water at a time with quick mixing. Once 50 ml of water has been added, add 50 ml more water with quick mixing. When 100 ml of water has been added, add additional 100 ml increments of water with mixing until 500 ml of water has been added. Then add 500 ml more water for a total of 1000 ml water added. Let the solution mix. See Table 2 below for results.

TABLE 2

| Sample | Acid | Solubility | Results | Comments |
|---|---|---|---|---|
| A | Malic | Good | ~100 particles left | |
| B | Glycine | Poor | | |
| | Glycine | Poor | | 1 gm acid, 1 gm chitosan, 1.6 gm sodium acetate trihydrate |
| C | Citric | Poor-Fair | ~500 particles left | |
| | Citric | Fair | ~100 particles left | 2 gm acid, 1 gm chitosan |
| D | Tartaric | Poor-Fair | 1000 swollen particles | |
| | | Good | Only a few particles left | 2 gm acid, 1 gm chitosan |

Some solid acids solubilized chitosan well using the slow addition of water. Others needed more solid acid to dissolve the chitosan. And still other solid acids did not completely solubilize the chitosan using the slow water addition method even with additional acid.

Not all solid acids performed in a similar manner in solubilizing chitosan using the methods described above. The solid chitosan in some blends would not dissolve when added to a large volume of water (such as in Test 1). Surprisingly, the chitosan in these blends would dissolve when a small amount of water was slowly added to the blend. Some solid acids would not solubilize chitosan under any of the conditions tested.

Example 3

Dissolution of Different Types of Chitosan

Test 3. A different type and lot of solid chitosan was used to determine if it was soluble at 0.1% as in Test 1 above. The solid chitosan used in Examples 1 and 2 was derived from crab shell. A different solid chitosan was then prepared from Icelandic shrimp shell, ground to a particle size where about 90% of the particles ranged from about 125 microns to about 850 microns, as before. As the chitosan was sourced from different starting materials, the molecular weights and the percent deacetylation differed between the two chitosans. The solid acid used was adipic acid. The results were very comparable to the results with the previous lot and type of solid chitosan: the solid chitosan dissolved fast and only a few particles were left.

Example 4

Very High Volume Water Dissolution of Blends Containing Low Chitosan Concentration Test 4. Table 3 below shows the results from an experiment in which a very high volume of water was used to attempt to dissolve the chitosan acid blends, very much like Test 1 above. But unlike Test 1 above, the concentration of both solid chitosan and solid acid was 10 times less: the concentration of solid chitosan was 0.01% vs. 0.1% in Test 1 above and the concentration of solid acid was 0.01% vs. 0.1% in Test 1. The experiment entailed mixing 0.1 gm of solid chitosan with 0.1 gm of solid acid, then slowly adding it to 1 L of mixing water.

The solubility of the chitosan was very poor at this concentration of acid. There seems to be a limit to how low the acid chitosan concentration can go when attempting to solubilize chitosan using this method of batch solubilization using large amounts of water.

TABLE 3

Very high volume (water); 0.01% chitosan; 0.1 gm chitosan in 1 L water blended with solid acids.

| Sample | Acid | Solubility | Time | Results | Comments |
|---|---|---|---|---|---|
| 1 | Adipic | Poor | Slow | ~1000s particles left | Some slight dissolving |
| 2 | Glutamic | Poor | Slow | ~1000 particles left | No solubility. |

TABLE 3-continued

Very high volume (water); 0.01% chitosan; 0.1 gm
chitosan in 1 L water blended with solid acids.

| Sample | Acid | Solubility | Time | Results | Comments |
|---|---|---|---|---|---|
| 3 | Maleic | Poor | Slow | ~1000s particles left | Very little solubility observed |
| 4 | Solid Lactic | Poor | Slow | ~1000s particles left | Possibly some dissolving |

Example 5

Permeable Soluble Chitosan Delivery Device

Test 5. In the next experiment, the blends were put into fabric bags or sachets made from the same material as what is used for the StormKlear® Gel Floc™ contactor. The fabric has small holes or pores to allow the release of the solubilized chitosan. The size of the sachet was about 2¼"×2¼" and contained 2.25 gm of solid acid mixed with 2.25 gm of solid chitosan. The particle size of the solid acid was typically smaller than the particle size of the chitosan, e.g., the solid acid was more of a powder, such as smaller than about 125 microns. The sachets were then placed into flowing tap water to determine if soluble chitosan would be released. Three sachets were made of dry blends—one with solid adipic acid, one with solid lactic acid, and the last made with solid malic acid. The solid adipic and solid lactic acid chitosan admixtures worked both in Test 1 (0.1% chitosan concentration solubilization) and Test 2 (low volume solubility addition), and poorly in Test 4 (very high water solubility, 0.01% chitosan). Solid malic acid, on the other hand, did not work well in Test 1: it only worked well in Test 2.

All three sachets had soluble chitosan coming out of them within 15 minutes of being introduced to the flowing tap water. After about an hour, the sachets were placed in separate beakers containing 3.5 L of mixing water and allowed to stir for at least overnight. When viewed after at least overnight mixing, much of the chitosan had been solubilized and the sachets only had small amounts of solubilized gel left in them. Even though large amounts of water were passed over the sachets, the blend was still able to be solubilized.

Example 6

High Ph Dissolution of Blends Contained on a Permeable Soluble Chitosan Delivery Device Test 6. Experiment using the sachets (porous fabric bags) of Example 5 in high pH (8.5) water. This experiment was used to determine if the blends remained soluble in higher pH water.

Two sachets were placed in 4 gallons of recirculating water at first, then placed into 20 gallons later in the day. A pH controller and 0.1 N NaOH was used to keep the pH at approximately 8.4-8.8. One sachet used solid malic acid and the other used solid lactic acid. The 20 gallons of water was changed twice a day, once in the morning and once in the afternoon. The reason the water was changed was to remove any solubilized chitosan building up, so that the solubility limit of chitosan at that pH was not reached, which would retard the release of additional chitosan. The test was run over the course of 3 days and the sachets were examined periodically. The sachets released chitosan immediately upon placement in the high pH water, and solubilized chitosan gel could be seen on the outside of the sachets. By the second day, the sachet had swelled and, when pressed, chitosan gel came out. On the third day the sachet with the lactic acid was less swollen but the sachet with the malic acid was about the same. Both seem to have solubilized chitosan gel in them. It seems under these conditions the high pH of 8.5 does not seem to prevent the solubilization of the chitosan. The size and weight of the sachets were different, demonstrating that the release rate of the chitosan between the two blends was different. The water containing the released chitosan was able to flocculate sediment suspended in water.

Example 7

Blends Having Larger Solid Chitosan Particle Sizes

The table below shows the results of using larger chitosan particle size (about 1700 microns or less and flake about 0.5 to about 1 cm) compared to previous Examples and the effect on solubility. With a solid acid that solubilizes chitosan well such as adipic acid, the 0.1% concentration method and low volume solubility (LVS) method have good solubility results. Complete solubility takes longer because of the larger particle size. Solid malic acid, which has a good LVS with the standard particles (that is, wherein about 90% of the particles range in size from about 125 microns to about 850 microns, as described above), did not have as good solubility with the larger particles (even allowing hours to dissolve) unless 2 times the normal amount of acid was used. See the table below.

TABLE 4

| Sample | Acid | Solubility | Results | Comments |
|---|---|---|---|---|
| <1700 microns | Adipic | good | Only a few particles left | 0.1% Conc |
| Flake | Adipic | good | Only a few particles left | 0.1% Conc |
| <1700 microns | Adipic | good | Only a few particles left | Low volume solubility (LVS) |
| Flake | Adipic | good | Only a few particles left | Low volume solubility (LVS) |
| <1700 microns | Malic | poor | ~100s particles left | Low volume solubility (LVS) |
| Flake | Malic | poor | ~100s particles left | Low volume solubility (LVS) |
| <1700 microns | Malic | good | Only a few particles left | LVS, 2× acid |
| Flake | Malic | good | Only a few particles left | LVS, 2× acid |

As another part of this experiment, the blends with the larger particle size were placed inside sachets as used in Example 5 to determine solubility performance. The sachets were placed in running tap water for 30 minutes then placed into 20 gallons of pH 7 controlled water until the end of the experiment. The sachets with solid adipic acid released chitosan well and no particles were left in the sachet at the end of the experiment. See the table below. The sachet with 2 times the normal amount of solid adipic acid seemed to release the chitosan faster. The sachets with 2 times the normal amount of solid malic acid released chitosan to some extent but some particles were left behind at the end of the experiment. More particles were left behind in the sachet with flake in it. Possibly more solid acid would work better.

TABLE 5

| Sample | Acid | Solubility | Results | Comments |
|---|---|---|---|---|
| –10 | Adipic | good | Soluble gel is released | Sachet, all gone |
| Flake | Adipic | good | Soluble gel is released | Sachet, all gone |
| Flake | Adipic | good | Soluble gel is released | Sachet 2× acid, all gone |
| –10 | Malic | fair-poor | Soluble gel is released | Sachet 2× acid, Particles left |
| Flake | Malic | fair-poor | Soluble gel is released | Sachet 2× acid, Particles left |

Example 8

Solid Chitosan/Solid Sodium Diacetate Blends

Test 1: Mix 2 gm of sodium diacetate and 1 gm of chitosan. Then slowly pour this admixture into 1 L of stirring deionized water. Solubility, fair; Time, medium.

Test 2: Mix 3 gm of sodium diacetate and 1 gm of chitosan. Then slowly pour this admixture into 1 L of stirring deionized water. Solubility, good; Time, medium.

Test 3: Low water volume solubility (LVS) method: Mix 1 gm of sodium diacetate and 1 gm of chitosan. Then slowly add water (2.5-5.0 ml) to this admixture and mix. Allow time (up to 5 minutes) for the chitosan to swell, then slowly add more water, about 2.5-5.0 ml at a time. Allow time for the chitosan to swell and dissolve. Chitosan was mostly soluble under this method.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of making a solution of chitosan comprising:
   (1) selecting a desired final chitosan concentration having a total volume of water, $V_F$;
   (2) obtaining a blend comprising:
      a solid chitosan that may be partially protonated but is greater than 80% insoluble when added to water and in a dry, free-flowing, particulate form, and
      a solid acid or a solid agent that generates a proton in situ in the presence of water,
      wherein the solid acid or the solid agent that generates a proton in situ in the presence of water is in a dry, free-flowing, particulate form,
      wherein the solid chitosan and the solid acid or the solid agent that generates a proton in situ in the presence of water are not reacted together or otherwise chemically bound;
   (3) adding a quantity of water $V_1$, to the blend, wherein $V_1$ is less than $V_F$, and $V_1$ is effective to swell and dissolve the solid chitosan to form a gel within a predetermined time period; and
   (4) after the solid chitosan has swelled and dissolved to form a gel and before the gel dries, adding water to the gel to dissolve the gel and bring the total volume of added water to $V_F$, thereby producing a solution of chitosan of the desired concentration.

2. The method of claim 1, wherein the predetermined time period is about 15 to about 30 minutes.

3. The method of claim 1, wherein the solid chitosan has an average molecular weight of between about 20,000 Da and about 2,000,000 Da.

4. The method of claim 1, wherein the solid chitosan has a percent deacetylation of greater than about 50%.

5. The method of claim 1, wherein the solid chitosan has a particle size of about 125 microns to about 850 microns.

6. The method of claim 1, wherein the solid chitosan has a particle size of more than about 850 microns.

7. The method of claim 1, wherein the solid acid is a protic acid.

8. The method of claim 1, wherein the solid acid is malic acid, citric acid, tartaric acid, sodium diacetate, or potassium diacetate.

9. The method of claim 1, wherein the solid acid is sodium diacetate or potassium diacetate.

10. The method of claim 1, wherein the solid agent that generates a proton in situ in the presence of water is selected from the group consisting of a solid organic acid lactone, and a solid organic acid anhydride.

11. The method of claim 1, wherein the solid acid or the solid agent that generates a proton in situ in the presence of water has a particle size that is less than the particle size of the solid chitosan.

12. The method of claim 1, wherein the ratio of the solid chitosan to the solid acid or the solid agent that generates a proton in situ in the presence of water ranges from about 1:10 to about 10:1 (wt./wt.).

13. The method of claim 1, wherein the ratio of solid chitosan to the solid acid or the solid agent that generates a proton in situ in the presence of water is about 1:1 (wt./wt.).

14. The method of claim 1, wherein the ratio of solid chitosan to the solid acid or the solid agent that generates a proton in situ in the presence of water is about 1:2 (wt./wt.).

15. The method of claim 1, wherein the particle size of the solid chitosan is within about 20% of the particle size of the solid acid or the solid agent that generates a proton in situ in the presence of water.

16. The method of claim 1, wherein the blend further comprises glycerin.

17. The method of claim 1, wherein the blend further comprises a solid salt of the solid acid or a salt of a different solid acid, wherein the salt is in a dry, free-flowing, particulate form.

18. The method of claim 1, wherein the blend further comprises a solid preservative acid, a solid salt of a preservative acid, or a solid antimicrobial agent, wherein the solid preservative acid, the solid salt of a preservative acid, or the solid antimicrobial agent is in a dry, free-flowing, particulate form.

19. The method of claim 1, wherein the blend further comprises a solid metal salt that is in a dry, free-flowing, particulate form.

20. The method of claim 1, wherein the blend further comprises a solid, neutral polysaccharide that is in a dry, free-flowing, particulate form.

21. The method of claim 1, wherein the blend further comprises a solid cationic or solid anionic polysaccharide, wherein the solid cationic or solid anionic polysaccharide is in a dry, free-flowing, particulate form.

22. The method of claim 1, wherein the blend further comprises a solid organic amine that is in a dry, free-flowing, particulate form.

23. The method of claim 1, wherein the blend is further defined as a blend of a solid chitosan, a solid protic acid, and a solid organic acid anhydride, wherein the solid chitosan, the solid protic acid, and the solid organic acid anhydride are each in a dry, free-flowing, particulate form.

24. The method of claim 1, wherein the blend further comprises sodium acetate.

25. The method of claim 1, wherein the desired final chitosan concentration, $V_F$, ranges from about 1% to about 5% (wt./wt.).

26. The method of claim 1, wherein the desired final chitosan concentration, $V_F$, ranges from about 1% to about 3% (wt./wt.).

27. A method of making a solution of chitosan comprising:
(1) selecting a desired final chitosan concentration having a total volume of water, $V_F$;
(2) obtaining a blend consisting of:
a solid chitosan that may be partially protonated but is greater than 80% insoluble when added to water and in a dry, free-flowing, particulate form,
a solid acid defined as solid malic acid, solid citric acid, or solid tartaric acid, wherein each solid acid is in a dry, free-flowing, particulate form, wherein the solid chitosan and the solid acid are not reacted together or otherwise chemically bound, and
optionally, a component selected from the group consisting of solid sodium acetate, glycerin, a solid salt of the solid acid or a solid salt of a different solid acid, a solid preservative acid, a solid salt of a preservative acid, a solid antimicrobial agent, a solid metal salt, a solid neutral aqueous-soluble polysaccharide, a solid cationic aqueous-soluble polysaccharide, a solid anionic aqueous-soluble polysaccharide, a solid organic amine, or a combination thereof, wherein each component aside from glycerin is in a dry, free-flowing, particulate form;
(3) adding a quantity of water $V_1$, to the blend, wherein $V_1$ is less than $V_F$, and $V_1$ is effective to swell and dissolve the solid chitosan to form a gel within a predetermined time period; and
(4) after the solid chitosan has swelled and dissolved to form a gel and before the gel dries, adding water to the gel to dissolve the gel and bring the total volume of added water to $V_F$ thereby producing a solution of chitosan of a desired concentration.

28. The method of claim 27, wherein the predetermined time period is about 15 to about 30 minutes.

29. The method of claim 27, wherein the method of step (4) comprises adding a plurality of incremental volumes of water, wherein each incremental volume may be the same or different, with mixing after each addition, until $V_F$ is achieved, thereby providing solubilized chitosan of a desired concentration.

* * * * *